(12) United States Patent
Wen

(10) Patent No.: US 6,729,732 B1
(45) Date of Patent: May 4, 2004

(54) TRANSPARENT FILM PROJECTOR

(76) Inventor: Tseng Ching Wen, P.O. Box 2-10, Tainan City (TW)

( * ) Notice: Subject to any disclaimer, the term of this patent is extended or adjusted under 35 U.S.C. 154(b) by 0 days.

(21) Appl. No.: 10/427,560

(22) Filed: Apr. 28, 2003

(51) Int. Cl.⁷ .................................................. G03B 21/00
(52) U.S. Cl. ...................................... 353/109; 353/118
(58) Field of Search ................................ 353/103, 108, 353/109, 118, DIG. 2

(56) References Cited

U.S. PATENT DOCUMENTS

| | | | | | |
|---|---|---|---|---|---|
| 1,003,774 A | * | 9/1911 | Metzger | ...................... | 353/109 |
| 1,167,399 A | * | 1/1916 | Gillam | ........................ | 353/111 |
| 1,245,454 A | * | 11/1917 | Gilmore | ...................... | 353/59 |
| 1,258,905 A | * | 3/1918 | Isbills | .......................... | 353/109 |
| 1,260,673 A | * | 3/1918 | Isbills | .......................... | 353/109 |
| 1,274,530 A | * | 8/1918 | Fritsche | ...................... | 353/109 |
| 1,321,241 A | * | 11/1919 | Olvis | ........................... | 353/89 |
| 1,349,725 A | * | 8/1920 | Klaiber | ....................... | 353/109 |
| 2,288,934 A | * | 7/1942 | Barth | .......................... | 353/109 |
| 2,669,157 A | * | 2/1954 | Schmitt | ...................... | 353/109 |
| 2,720,137 A | * | 10/1955 | Musebeck | ................... | 353/109 |
| 3,045,867 A | * | 7/1962 | Flynn | .......................... | 221/211 |
| 5,833,342 A | * | 11/1998 | Echapare Ibarrola et al. | .... | 353/109 |

* cited by examiner

*Primary Examiner*—William C. Dowling

(57) ABSTRACT

A transparent film projector includes a projector frame provided inside with all the components. A plurality of chain wheels are provided inside the projector frame for an annular chain strap to extend around. The annular chain strap is provided at the inner side with plural extension plates respectively having an extension strip fixed at the outer side and an orienting member secured at the inner side, and the extension strip has its outer end clasped by a spring. The orienting member is positioned at the inner side of an orienting rail, which guides the orienting member to move in a fixed direction so as to make the transparent films move smoothly. Besides, each transparent film has its opposite ends respectively hooked by the spring, so it can be flattened to move smoothly and replaced conveniently.

4 Claims, 4 Drawing Sheets

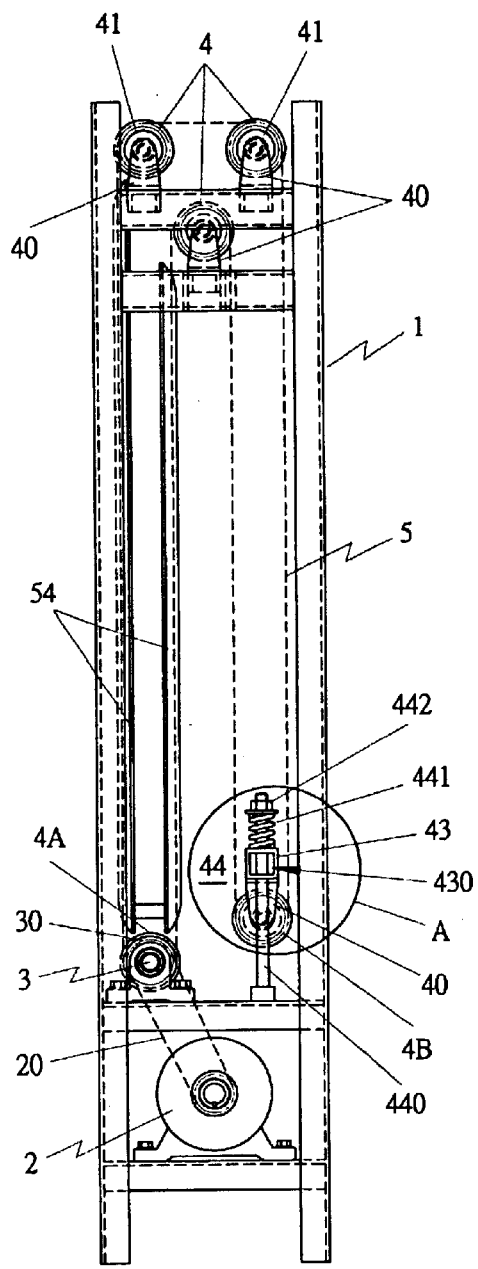
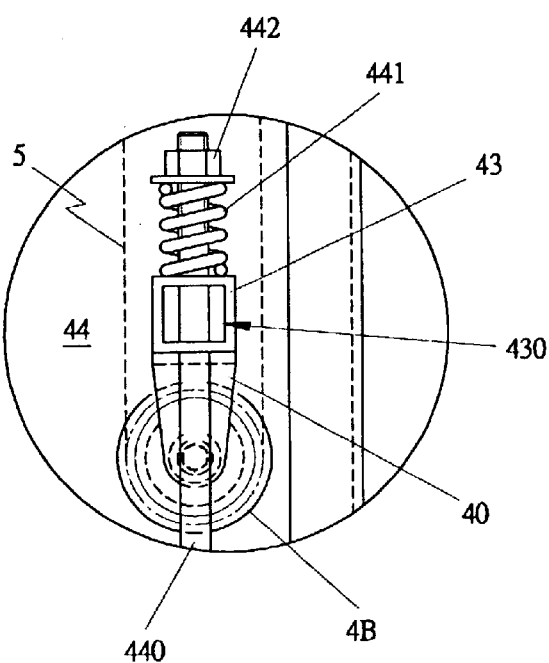
FIG 3
FIG 4

TRANSPARENT FILM PROJECTOR

BACKGROUND OF THE INVENTION

This invention relates to a transparent film projector, particularly to one able to let the transparent film moved smoothly, kept flattened and also replaced easily.

Conventional projecting equipment employed for showing advertising slides or transparent films and able to replace the transparent films automatically, as shown in FIGS. 1 and 2, includes a projector frame (A) provided therein with all the components. A plurality of rollers 13 are provided inside the projector frame A for moving slides C forward to carry out circulatory displaying. However, when the rollers B move the slides C forward, they contact directly with the display portraits of the slides C and consequently may wear off the slides C after employed for a period of time. Although the conventional projecting equipment has function of displaying advertising contents vividly by showing different drawings of the slides C, yet the slides C are liable to slip off the rollers B when the advertising contents are replaced, resulting in much trouble especially in replacing huge slides. Besides, the slides C of the conventional projecting equipment are wound vertically so they are likely to slip and drop, failing to move smoothly or possible to be damaged.

SUMMARY OF THE INVENTION

The objective of the invention is to offer a transparent film projector having transparent films wound and moved horizontally, able to prevent the transparent films from slipping and dropping or worn off.

The features of the invention are described below.

1. The projector is provided with an annular chain strap for transparent films to be steadily wound thereon, able to move the transparent film smoothly and avoid slipping.

2. Each transparent film is pulled and supported by plural springs, letting the transparent films moved flatly and acquiring an effect of displaying vividly.

3. Each transparent film is held by a support strip, able to let the transparent film move comparatively smoothly and impossible to wear off the pictures of the transparent films.

4. The annular chain strap of the projector is provided with plural extension plates respectively having an extension strip and an orienting member secured thereon to enable the transparent films to move in a fixed direction, and a spring having one end hooking the extension strip and the other end hooking the through hole of the transparent film, able to replace the transparent film independently.

5. The projector is provided with an orienting rail at the inner side of the annular chain strap, able to guide and hold an orienting member to move in a fixed direction.

BRIEF DESCRIPTION OF DRAWINGS

This invention will be better understood by referring to the accompanying drawings, wherein:

FIG. 3 is a partial side cross-sectional view of a transparent film projector in the present invention:

FIG. 4 is a partial magnified view of the part marked (A) in FIG. 3:

DETAILED DESCRIPTION OF THE PREFERRED EMBODIMENT

Figure 1:
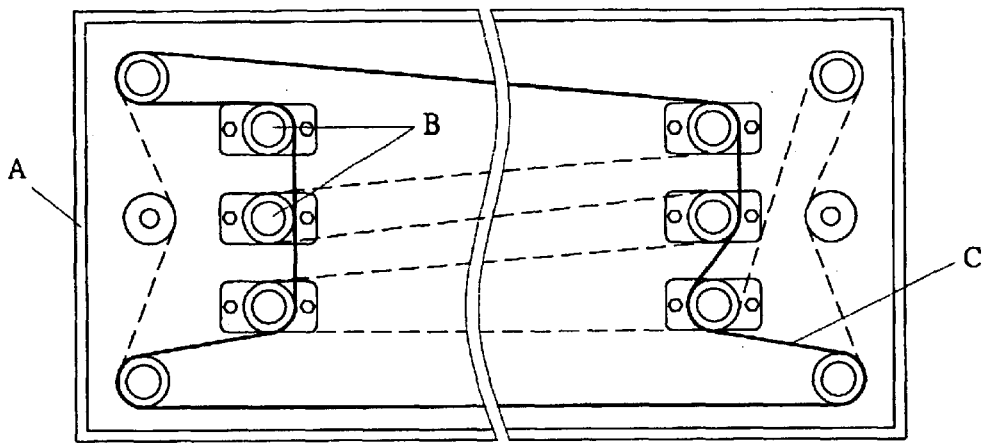
FIG. 1 is a side cross-sectional view of a conventional transparent film projector.
Figure 2:
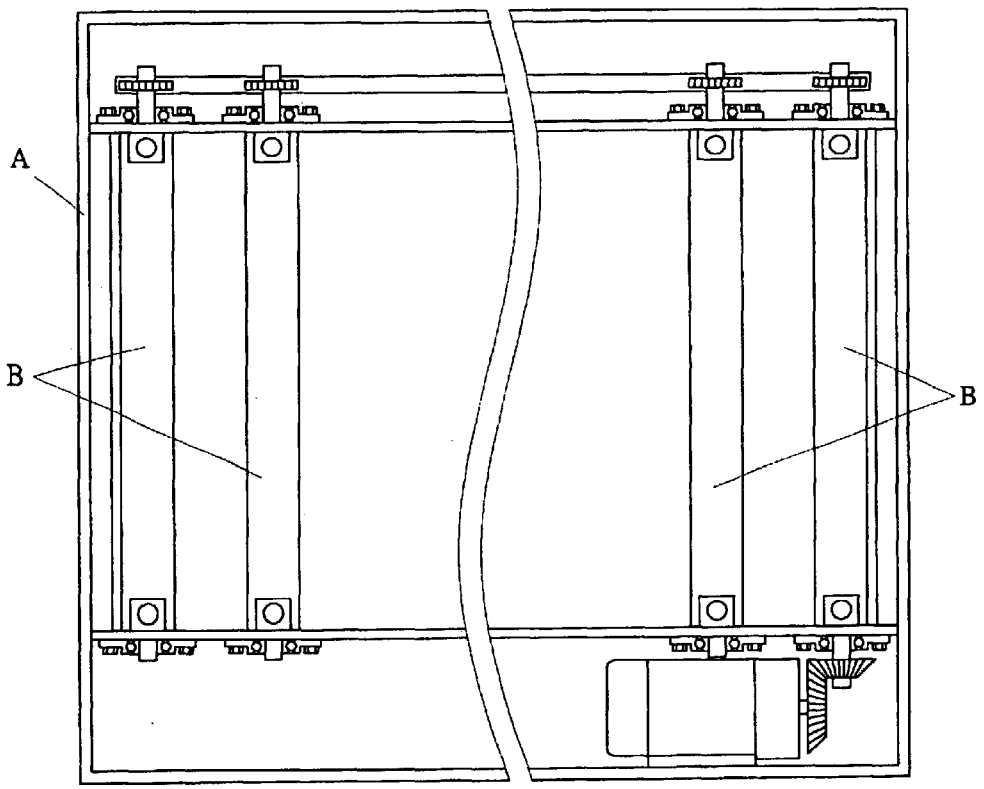
FIG. 2 is a front view of the conventional transparent film projector.

A preferred embodiment of a transparent film projector in the present invention, as shown in FIGS. 3–9, includes a projector frame 1, a transmitting member 2, a plurality of chain wheels 4, and an annular chain strap 5 as main components combined together.

The projector frame 1 is provided therein with all the components. The transmitting member 2 positioned at the lower interior of the projector frame 1 is connected with the small chain wheel 30 of a transmitting shaft 3 by a chain 20 for driving the transmitting shaft 3 to rotate, as shown in FIG. 3.

The chain wheels 4 are provided together with the transparent films, which are wound on the annular chain strap 5. Each chain wheel 4 is combined with a wheel holder 40, supported by a shaft 41 and wound thereon with an annular chain strap 5. Two chain wheels 4A are respectively positioned at the opposite sides of the transmitting shaft 3 to rotate together with the transmitting shaft 3 and actuate the other chain wheels 4 to rotate through the annular chain strap 5. Another two chain wheels 4B are respectively combined with a wheel holder 40, which is respectively provided at the lower opposite sides of the tension-adjusting shaft 43 of the annular chain strap 5. The tension-adjusting shaft 43 has its opposite sides respectively bored with a combining hole 430 for assembling an adjusting device 44. The adjusting device 44, as shown in FIG. 4, is provided with a vertical shaft 440, which has its lower end secured on the projector frame and its upper end inserted through the combining hole 430 and fitted around with a damper spring 441 and then screwed with a nut 442. Thus, the damper spring 441 having its lower end pushing against the topside of the tension-adjusting rod 43 is able to adjust tension of the annular chain strap 5 automatically to keep the transparent films moving flatly and smoothly.

Figure 7:
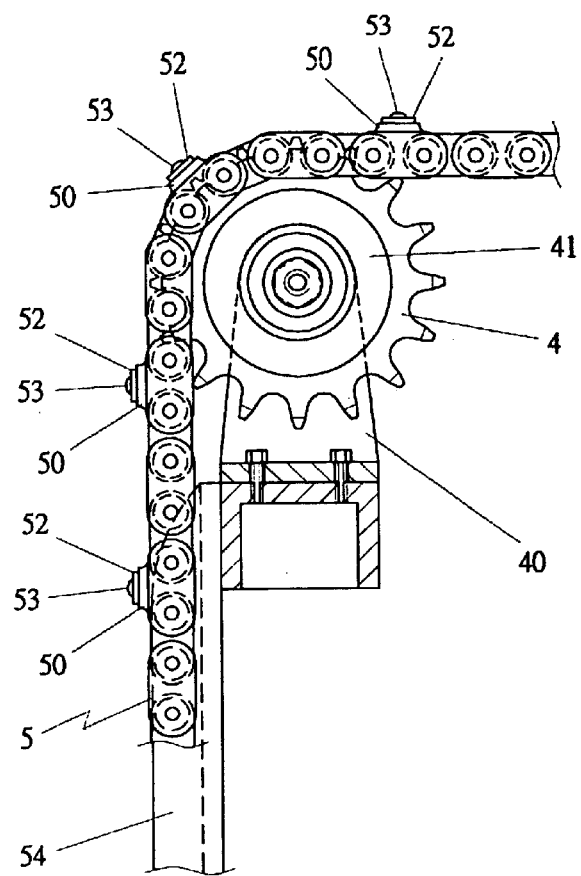
FIG. 7 is a cross-sectional view of the annular chain strap and the chain wheels of the projector in the present invention.
Figures 8, 9:
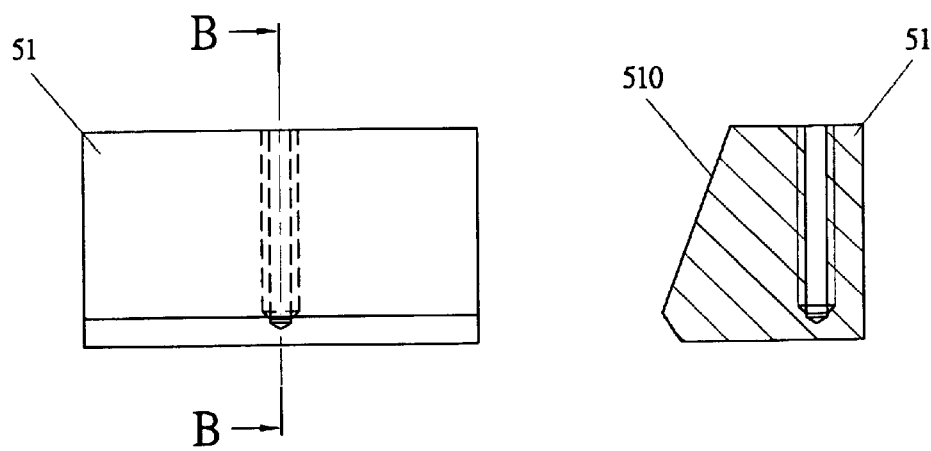
FIG. 8 is a side-sectional view of the orienting member of the projector in the present invention.
FIG. 9 is a cross-sectional view of the line B—B in FIG. 8.

The annular chain strap 5 wound on the chain wheels 4 is fixed at the inner side with plural extension plates 50 respectively having an orienting member 51 secured at the inner side and an extension strip 52 fixed at the outer side, with the extension plates 50, the orienting member 51 and the extension strip 52 combined together by a bolt 53, as shown in FIGS. 7–9. The orienting member 51 is formed with an acute angular side 510 having an angle smaller than 90 degrees. Then, an orienting rail 54 is provided at the inner side of the annular chain strap 5 and formed with a contained angular side 540 for the acute angular side 54 of the orienting member 51 to be positioned thereon to let the orienting member 51 combined with the orienting rail 54 steadily and slide smoothly along the inner side of the orienting rail 54 to carry out orienting motion.

Figure 5:
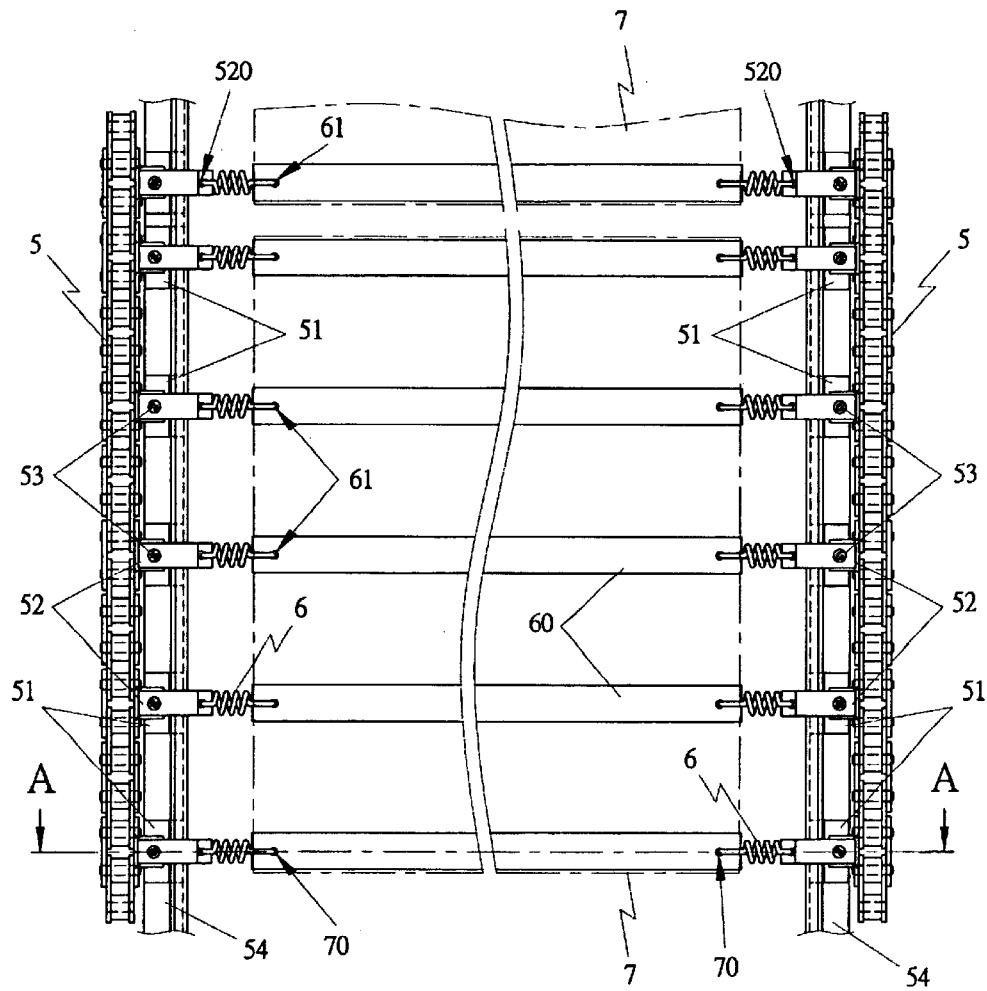
FIG. 5 is a partial cross-sectional view of the transparent film projector in the present invention.
Figure 6:
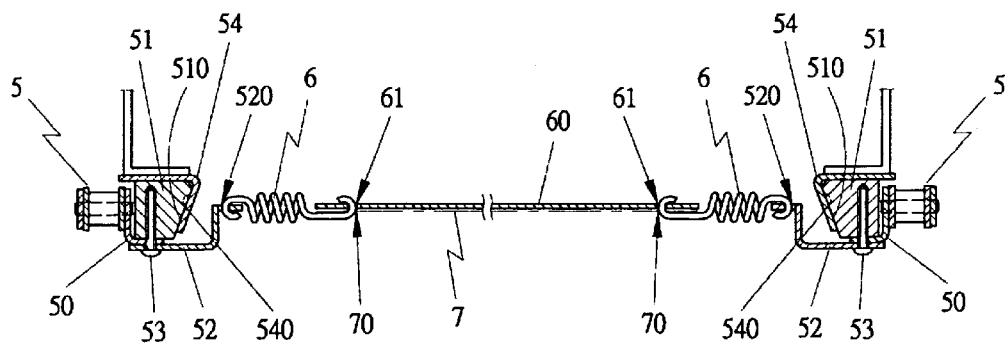
FIG. 6 is a cross-sectional view of the line A—A in FIG. 5.

In addition, the extension strip 52 is bored with a through hole 520 for one end of the spring 6 to hook therein. The spring 6 has the other end hooking the through holes 70 and 61 of the transparent film 7 and the support strip 60, as shown in FIGS. 5 and 6, so that the transparent film 7 can properly be pulled and flattened by the resilience of the springs 6. Thus, each transparent film 7 is pulled and supported by the plural springs 6 so that it can be replaced with another independently with quickness.

While the preferred embodiment of the invention has been described above, it will be recognized and understood that various modifications may be made therein and the appended claims are intended to cover all such modifications that may fall within the spirit and scope of the invention.

What is claimed is:

1. A transparent film projector comprising:

a projector frame provided inside with all the components, said projector frame provided inside with a transmitting member, said transmitting member consisting of an endless chain extending around a small chain wheel connected with a transmitting shaft, said transmitting member driving said transmitting shaft to rotate:

a plurality of chain wheels respectively combined with a wheel holder, each said chain wheel inserted with a shaft for support, said chain wheels wound thereon with an annular chain strap, two of said chain wheels respectively positioned at the opposite sides of said transmitting shaft, said two chain wheels rotating together with said transmitting shaft rotated by said annular chain strap: and said annular chain strap extending around said chain wheels, said annular chain strap having plural extension plates fixed at an inner side, each said extension plate fixedly provided with an orienting member at the inner side and an extension strip at the outer side, said extension plate and said orienting member as well as said extension strip combined together by a bolt, an orienting rail disposed at the inner side of said annular chain strap, said orienting member combined with said orienting rail, said extension strip bored with a through hole in the end, a spring having one end hooking said through hole of said extension strip, said spring having the other end hooking the through holes of a transparent film and a support strip.

2. The transparent film projector comprising:

a projector frame provided therein with the entire components, said projector frame provided with a transmitting member in the interior, said transmitting member consisting of an endless chain extending around a small chain wheel connected with a transmitting shaft, said transmitting member driving said transmitting shaft to rotate:

a plurality of chain wheels respectively combined with a wheel holder, each said chain wheel inserted with a shaft for support, an annular chain strap extending around each said chain wheel, two of said chain wheels respectively disposed on the opposite sides of said transmitting shaft, said two chain wheels rotating together with said transmitting shaft, another two of said chain wheels positioned on the opposite sides of a tension-adjusting rod, said tension-adjusting rod having a combining hole bored respectively at the opposite sides for receiving an adjusting device, said adjusting device provided with a vertical shaft, said vertical shaft inserted through said combining hole of said tension-adjusting rod, said vertical shaft having its lower end secured on said projector frame, said vertical shaft having its upper end inserted through said combining hole of said tension-adjusting rod and connected with a damper spring, said vertical shaft having its upper end screwed with a nut, said damper spring having its lower end pushing against the topside of said tension-adjusting rod: and an annular chain strap extending around said chain wheels, said annular chain strap fixed with plural extension plates at the inner side, each said extension plate fixedly provided with an orienting member at the inner side and an extension strip at the outer side, said extension plate and said orienting member as well as said extension strip combined together by a bolt, an orienting rail positioned at the inner side of said annular chain strap, said orienting member combined with said orienting rail, said extension strip bored with a through hole in the end for one end of a spring to hook thereon, said spring having the other end hooking the through holes of a transparent film and a support strip.

3. The transparent film projector as claimed in claim 1 or 2, wherein said orienting member is formed with an acute angular side.

4. The transparent film projector as claimed in claim 3, wherein said orienting rail is formed with a contained angular side for combining said acute angular side of said orienting member.

* * * * *